Jan. 7, 1958  G. M. GIANNINI ET AL  2,818,730
RETRACTABLE AIRCRAFT INSTRUMENT
Filed Aug. 5, 1955  2 Sheets-Sheet 1

GABRIEL M. GIANNINI,
ARTHUR E. MILLER,
MILFORD D. GIBSON,
INVENTORS.

BY
Barbber + Scantlebury
ATTORNEYS.

Jan. 7, 1958 G. M. GIANNINI ET AL 2,818,730
RETRACTABLE AIRCRAFT INSTRUMENT
Filed Aug. 5, 1955 2 Sheets-Sheet 2
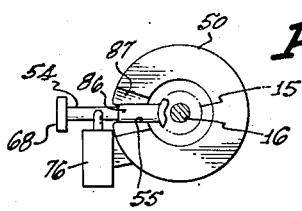
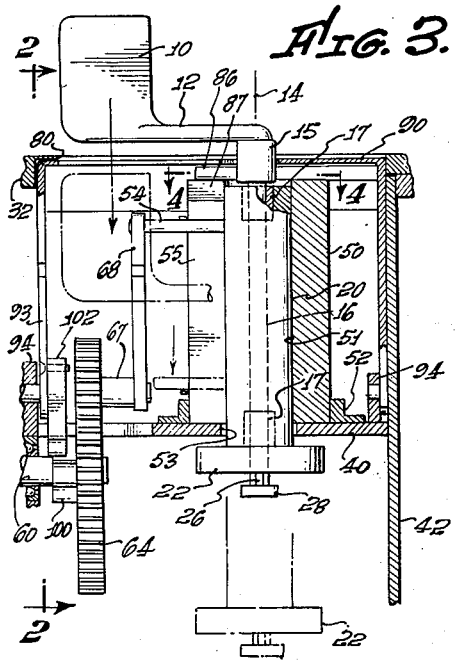
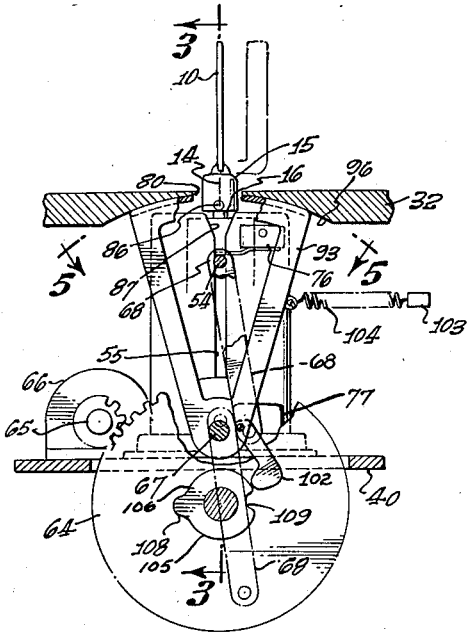
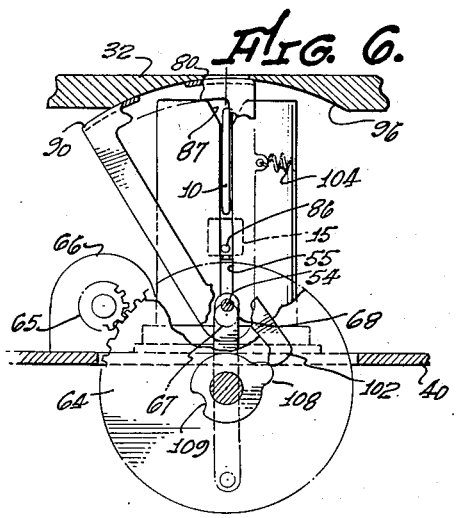
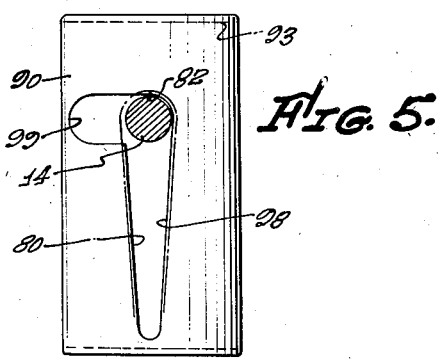
GABRIEL M. GIANNINI,
ARTHUR E. MILLER,
MILFORD D. GIBSON,
INVENTORS.
BY
Barbelee + Scantlebury
ATTORNEYS.

2,818,730

RETRACTABLE AIRCRAFT INSTRUMENT

Gabriel M. Giannini and Arthur E. Miller, Pasadena, and Milford D. Gibson, Los Angeles, Calif., assignors to G. M. Giannini & Co., Inc., Pasadena, Calif., a corporation of New York Application August 5, 1955, Serial No. 526,682

12 Claims. (Cl. 73—180)

This invention has to do with instruments for sensing and indicating one or more physical conditions of an airstream adjacent a surface such as the outer skin of an aircraft. The invention is concerned, more particularly, with mounting means by which such instruments may be withdrawn within the aircraft when not in use.

One type of instrument to which the invention pertains includes vane structure responsive to the direction of air movement past an aircraft, the output of such instruments being utilized, for example, to provide a measure of the angle of attack or angle of yaw of the aircraft in flight. Other types of instrument that require a sensing element exposed to the airstream include, for example, instruments for indicating the stagnation temperature of the airstream and instruments for indicating air speed as derived from the static and total pressures in the airstream. Sensing elements of two or more such types may be combined in a single instrument.

Previously available methods of mounting such devices on aircraft have not been fully satisfactory. Use of a forwardly extending boom, for example, typically adds considerably to the drag of the aircraft. Mounting on the wing often subjects the sensing element to undesirable movement, due to the twist and vibration of the wing in flight. Such movement is particularly objectionable in the case of airstream direction indicators, since it may produce serious inaccuracies in the indication. When instruments of the type described are mounted directly on the fuselage of the aircraft they are often exposed to accidental damage, especially when the aircraft is on the ground.

The present invention avoids all such disadvantages by providing simple and reliable mechanism by which the sensing element of such instruments may be retracted within the body of the aircraft when not in use. By making the instrument retractable in accordance with the invention, it may be mounted on the most advantageous portion of the aircraft for accurate and reliable operation, and yet is fully protected from damage when not in use.

A further advantage provided by the invention is that whenever the instrument is not in use, whether in flight or on the ground, it can be fully protected from the weather, for example, under conditions of heavy icing.

In accordance with the invention, means are provided for shifting at least the sensing portion of the instrument between an external operating position and an internal stowed position. That movement carries the instrument through an aperture of minimum size in the outer surface of the aircraft, means being preferably provided for completely closing that aperture both in operating and in stowed positions of the instrument. That is typically accomplished by means of shutter mechanism for the aperture that is shiftable between three distinct conditions, in which the aperture is fully open, fully covered, and partially covered, respectively, the latter condition of the shutter mechanism leaving unshuttered only that portion of the aperture through which the supporting structure of the instrument projects.

A further aspect of the invention provides means for automatically aligning the external portion of the instrument with the aperture in the aircraft surface when the instrument is to be stowed, and for releasing the instrument from such aligned condition when in operating position.

The term "aircraft" as employed herein is intended to include any vehicle adapted for movement with respect to the atmosphere.

A full understanding of the invention, and of its further objects and advantages, will be had from the following description of an illustrative embodiment, of which description the accompanying drawings are a part. For clarity of illustration, the invention will be described as it pertains to an instrument responsive to the direction of an airstream adjacent an aircraft surface. However, neither that fact nor any other particulars of the present illustrative embodiment is intended as a limitation upon the scope of the invention, which is defined in the appended claims.

In the drawings:

Fig. 2 is a fragmentary section on lines 2—2 of Figs. 1 and 3, showing the embodiment of Fig. 1 in an intermediate position;

Fig. 3 is a fragmentary section on line 3—3 of Fig. 2;

Fig. 4 is a fragmentary section on line 4—4 of Fig. 3;

Fig. 5 is a developed section on line 5—5 of Fig. 2;

Fig. 6 is a section like Fig. 2, but showing the apparatus in stowed position.

Figure 1:
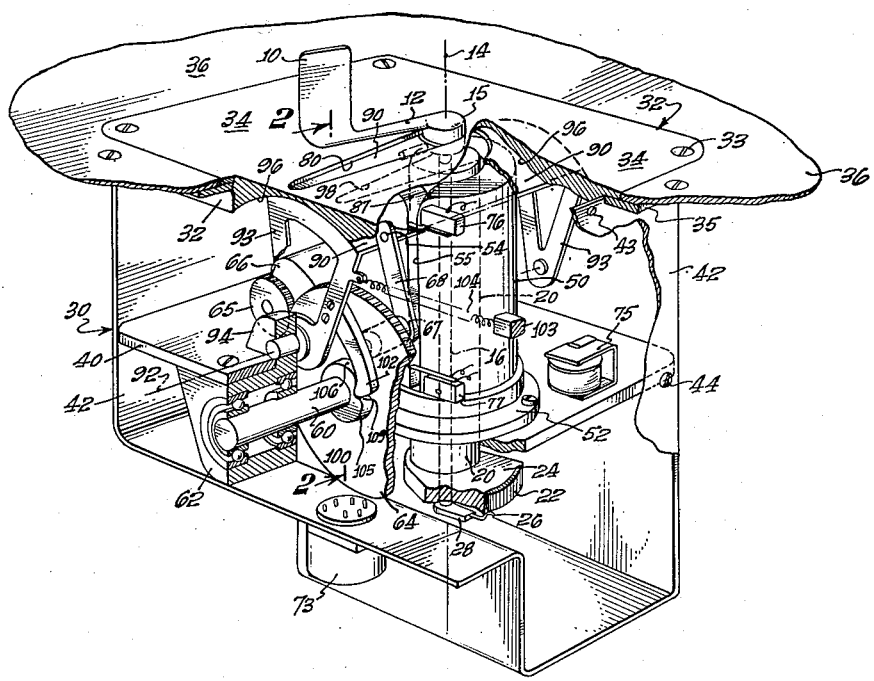
Fig. 1 is a partly schematic perspective of an illustrative embodiment of the invention, shown in operating position.

In the present illustrative embodiment, the sensing element of the instrument comprises a vane structure, represented as a single flat vane 10 integrally mounted on an arm 12, which is adapted to swing in response to the direction of an air stream about an axis shown schematically at 14. For that purpose arm 12 is rigidly mounted, as by the hub 15, on the outer end of shaft 16. That shaft is journaled on axis 14 with respect to a support member 20, preferably by means of ball bearings as indicated at 17 in Fig. 3. Support 20 may be of any convenient form, being shown illustratively as a tube coaxial with axis 14. Support 20 is supported by guide means of any suitable type for movement between an operating position, represented in Fig. 1, and a stowed position, represented in Fig. 6. That movement may be of any type, being shown illustratively as translational movement in the present embodiment. Swinging movement of vane 10 and shaft 16 about axis 14 is caused to develop a signal of any convenient type. As illustrated, a potentiometer winding 22 of arcuate form is rigidly mounted, as by the bracket plate 24, on the inner end of support member 20, and is swept by the potentiometer brush 26. That brush is mounted, as by the hub formation 28, in definite rotational relation on the inner end of shaft 16, and therefore moves over the potentiometer winding in definite correspondence to the swinging movement of the vane. An output signal may be derived in the usual way from such a potentiometer and may be employed for performing desired indicating or control functions in known manner.

In the present embodiment, the mounting means for support 20 includes a rigid frame, indicated generally at 30 and comprising an outer plate 32. Plate 32 is adapted to be mounted in the aircraft, as by the screws 33 and bracket frame 35, with its outer face 34 substantially flush with the skin of the aircraft, indicated at 36. Frame 30 includes also an inner structural portion, shown in the form of a plate 40 parallel to outer plate 30, on which the mechanism to be described may be directly mounted. As shown, the outer and inner plates 30 and 40 are rigidly related by means of the enclosing cover 42, which is secured to the respective plates by the screws 43 and 44.

Frame 30 carries structure adapted to guide movement of support member 20 between operating and stowed positions. That movement is translational in nature as illustratively shown, and the guide structure comprises the tubular post 50, which is rigidly mounted on plate 40 by means of a flange 52 at its inner end. The cylindrical inner surface of post 50 is aligned with a clearance bore 53 in plate 40 and forms a guideway 51 which fittingly encloses support 20 and permits it to slide longitudinally of axis 14. During such movement, rotation of support 20 is prevented, as by the pin 54, which is fixed in the support and extends radially through the fitting longitudinal slot 55 in post 50. Axial movement of support 20 may be driven in any suitable manner, the mechanism shown being particularly simple and reliable. A drive shaft 60 is journaled on the bracket 62 and carries the large gear 64, which is engaged by the pinion 65 on the shaft of an electric motor 66. Gear 64 carries a crank pin 67, which is linked by a connecting rod 68 to pin 54 in support 20. The crank is so arranged that the total axial movement of support 20 between the upper dead center position of crank pin 67 as shown in Fig. 1 and the lower dead center position of Fig. 6 provides the desired travel between operating and stowed positions of the instrument.

Figure 7:
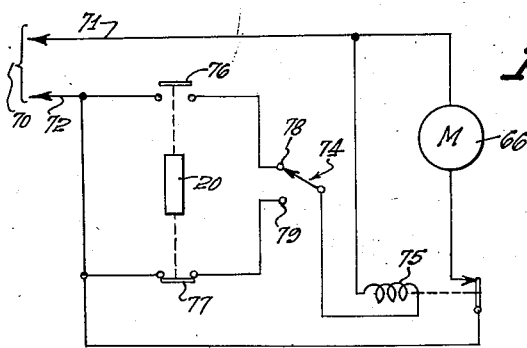
Fig. 7 is a schematic wiring diagram of an illustrative control system.

Electrical power is supplied to motor 66 in any suitable manner to cause gear 64 to turn selectively through the required 180° angle to shift support 20 from one position to the other. An illustrative control circuit for the motor is shown schematically in Fig. 7. Electrical power, which may be either alternating current or direct current, is provided from a source indicated at 70 via lines 71 and 72. A double throw control switch 74 has its switch arm connected to line 71 via the coil of a motor relay 75. The terminals 78 and 79 of switch 74 are connected to line 72 via the respective limit switches 76 and 77. Motor 66 is connected in series with the switch of relay 75 between lines 71 and 72. Alternatively, relay 75 may be omitted and the motor may be connected directly between line 71 and the switch arm of switch 74.

Limit switches 76 and 77 are so arranged that switch 76 is open only when support 20 is in operating position and switch 77 is open only when the support is in stowed position. For example, the switches may be operated directly by a suitable formation mounted to rotate with gear 64. As illustratively shown, the operating formation includes connecting rod 68 and oscillating pin 54, the switches being mounted directly on the outer surface of post 50 as shown in Figs. 1, 2 and 4, in position to be operated by pin 54 as it arrives at the respective ends of its travel. In operation of the described control circuit, with support 20 in operating position, switch 76 is open, switch 77 is closed, and control switch 74 is normally in the position shown in Fig. 7. The relay circuit is therefore open at limit switch 76 and the motor is idle. To shift the support to stowed position, control switch 74 is closed to terminal 79, completing a relay actuating circuit through closed limit switch 77 to energize the motor. The motor drives gear 64 until support 20 arrives at its stowed position, when limit switch 77 is opened, stopping the motor. The support may be returned to operating position by closure of control switch 74 to terminal 78. An advantage of the particular type of drive mechanism shown is that motor 66 does not require to be reversed. However, a reversible motor may be used, if preferred, the control circuit being modified accordingly in known manner. An electrical connector of conventional type is preferably provided, as indicated at 73, with sufficient terminals to accommodate power lines 71 and 72, the three connections to control switch 74, and the three usual connections, not shown, for output potentiometer 22, 26.

Movement of support 20 from operating to stowed position shifts vane 10 between its operating position outward of frame plate 32, illustrated in Fig. 1, and its stowed position inward of that frame plate, illustrated in Fig. 6. To accommodate that travel of vane 10, an aperture 80 is provided in the frame plate, or equivalent structure. That aperture is preferably elongated and arranged substantially along a radius with respect to axis 14. As shown, the radially inner end 82 of the aperture is semicircular in shape, and of suitable size to just enclose the outer portion of vane hub 15. The radially outer portion of aperture 80 tapers in width in such a way that it provides only comfortable clearance for passage of the vane structure when the latter is accurately aligned with the aperture. The angular position of aperture 80 with respect to axis 14 preferably, although not necessarily, corresponds to the equilibrium or zero position of vane 10.

In order to facilitate passage of the vane structure through aperture 80 as the instrument is shifted between operating and stowed positions, the invention further provides means for accurately aligning the vane with the aperture whenever such shifting action is initiated, and for effectively locking the vane in aligned position during the shifting movement. The vane is automatically released from that locked position upon arrival in operating position. Many different types of mechanism may be utilized for performing those functions, the particularly simple and effective means shown in the accompanying drawings being illustrative. That particular structure comprises a cam formation and a cam follower adapted to produce the desired rotary alignment of the vane by virtue of its axial movement. The cam follower in the present embodiment comprises the pin 86, fixed in vane hub 15 and projecting radially therefrom parallel to vane arm 12. Axial slot 55 in post 50 is adapted to fittingly receive the pin 86, and the outer end of the slot is flared to provide camming faces 87 adapted to cam pin 86 into alignment with the slot as it enters. The parallel faces of the remainder of the slot form locking surfaces adapted to retain the pin in aligned position. Pin 86 is preferably slightly thicker than the adjacent portion of vane arm 12, so that in intermediate and stowed positions the arm is held in spaced relation to the walls of the slot. Alternatively, the arm itself, or a formation carried thereby, may be employed as cam follower. When the instrument is returned to operating position, the cam follower is shifted axially out of slot 55, releasing the vane for normal swinging action in response to the airstream direction.

In accordance with a further aspect of the invention, a shutter mechanism is provided for closing aperture 80 effectively flush with the outer surface of the aircraft when the instrument is in both its operating and its stowed positions, and for uncovering the aperture to permit passage of the vane structure through it. As shown, all of those functions are performed by a single shutter blade 90, which is of partial cylindrical form and is mounted for swinging movement about a shutter axis 92 parallel to outer frame plate 32 and also parallel to the length of aperture 80. Shutter blade 90 may be supported, for example, by means of two shutter frames 93 which are pivoted on axis 92 in suitable brackets 94. The inner face of frame plate 32 is preferably formed with a cylindrical depression 96 which is coaxial with shutter axis 92 and just clears the shutter blade, the depth of that depression being such that the remaining thickness of the frame plate in the neighborhood of aperture 80 is very small.

The outer face of the shutter is then practically in the plane of the outer surface of the frame plate.

Shutter blade 90 is provided with a single aperture of special form, as shown illustratively in Fig. 5. Aperture 97 comprises an elongated portion 98 parallel to the shutter axis and adapted to substantially coincide with the whole of aperture 80 when the shutter member is in a particular open position. At the end of shutter aperture 97 that corresponds to the radially inner end 82 of aperture 80 is a leg 99, which extends transversely in one direction substantially at right angles, giving the entire aperture a general L form. Movement of the shutter to one side of its open position completely closes the aperture in plate 32, as shown in Fig. 6. Movement of the shutter to the other side of its open position brings leg 99 of the shutter aperture into alignment with the radially inner portion of plate aperture 80, but closes the remainder of the latter. Leg 99 of the shutter aperture is so formed as to fit in closely spaced relation around vane hub 15 when the latter is in operating position, as in Fig. 1. That vane hub may be considered to form part of the support structure for the vane, or may be considered as a part of the sensing element itself. It will be seen that the portions of the shutter blade that cover aperture 80 in idle and in operating position of the mechanism might comprise parts of two separate shutter blades controlled independently by any suitable means, such for example, as are to be described for controlling the single blade of the present embodiment. Accordingly, those shutter portions may be considered as distinct shutter means, whether physically integrated or not.

The present embodiment of the invention includes particularly simple and effective means for operating the shutter mechanism in coordination with movement of the instrument. A cam 100 is mounted on shaft 60 and engages a cam follower arm 102 which is rigidly mounted on shutter bracket 93. A spring 104 extending between shutter bracket 93 and a bracket 103 fixed on frame 30 yieldingly urges the shutter about shutter axis 92 in a direction to maintain cam follower 102 in engagement with the cam. Cam 100 comprises two circular cam surfaces 105 and 106 which have a common radius such that when cam follower 102 rides on those surfaces the shutter is maintained in open position (see especially Figs. 2 and 5). Cam surfaces 105 and 106 extend through relatively large equal angles of approximately 160° which are opposite to each other and correspond to positions of crank pin 67 other than its two dead center positions. The two portions of the cam surface corresponding to those crank positions depart from the described common radius in opposite directions, comprising the relatively sharp cam rise 108 which swings the shutter into closed position when the instrument is fully withdrawn (Fig. 6), and the relatively sharp cam depression 109 which permits spring 104 to swing the shutter into its third position when the instrument is fully extended, as in Fig. 1.

A particular advantage of the described type of mechanical interrelation of the shutter movement and the instrument movement is the fact that the crank action produces negligible instrument movement during a small angle as it leaves either dead center position, and that angle can be utilized to produce the required shift of the shutter into fully opened position. That action is typically illustrated in Figs. 2 and 3, for example, which show gear 64 rotated only about 20° from operating position (Fig. 1). That movement is sufficient to shift the shutter to fully open position, yet moves the vane structure only about 3% of its total travel. Hence, only a moderate amount of overtravel needs to be provided to produce the required shutter action after the vane is clear of the shutter.

We claim:

1. In a device for sensing a physical property of an airstream adjacent an outer surface of an aircraft, a frame having an apertured outer face and adapted to be mounted in an aircraft with the outer face substantially flush with an outer surface of the aircraft, a support mounted on the frame for movement between an operating position and an idle position, a sensing element mounted on the support, the sensing element extending through the aperture beyond the outer face of the frame in operating position of the support and being withdrawn inwardly of that face in idle position of the support, shutter means actuable to close the aperture substantially in the plane of the outer face, and control means actuable to shift the support between its said positions and to actuate the shutter means when the support is in idle position.

2. In a device for sensing a physical property of an airstream adjacent an outer surface of an aircraft, a frame having an apertured outer face and adapted to be mounted in an aircraft with the outer face substantially flush with an outer surface thereof, a support mounted on the frame for movement between an operating position and an idle position, a sensing element mounted on the support, the sensing element extending through the aperture beyond said surface in operating position of the support and being withdrawn inwardly of said surface in idle position of the support, control means actuable to shift the support between its said positions, shutter means responsive to the control means and acting to close the aperture when the support is in idle position, and shutter means responsive to the control means and acting, when the support is in operating position, to close that portion of the aperture not occupied by the sensing element.

3. In a device for sensing a physical property of an airstream adjacent an outer surface of an aircraft, a frame having an apertured outer face and adapted to be mounted in an aircraft with the outer face substantially flush with an outer surface of the aircraft, a support mounted on the frame for movement transversely of the face between an operating position and an idle position, an arm mounted on the support and extending outwardly therefrom through the aperture in operating position of the support, a sensing element mounted on the outer end of the arm, said arm and element being withdrawn within the face in idle position of the support, shutter means for the aperture, said shutter means acting in response to idle position of the support to close the aperture, acting in response to operating position of the support to close that portion of the aperture unoccupied by the arm, and acting in response to movement of the support to open the aperture for passage therethrough of the arm and element, and control means actuable to shift the support between its said positions.

4. In a device for sensing a physical property of an airstream adjacent an outer surface of an aircraft, a frame having an outer face and adapted to be mounted in an aircraft with the outer face substantially flush with an outer surface of the aircraft, there being an elongated aperture in the said face, a support mounted on the frame for movement transversely of the face between an operating position and an idle position, an arm mounted on the support and extending outwardly therefrom through one end portion of the aperture in operating position of the support, a sensing element mounted on the outer end of the arm and extending therefrom generally parallel to the length of the aperture, said arm and element being withdrawn within the face in idle position of the support, shutter means for the aperture comprising a shutter blade movable substantially in the plane of the frame aperture and having a shutter aperture therein, means acting in response to movement of the support to shift the shutter aperture into overlapping relation with the whole of the frame aperture to open the latter, means acting in response to idle position of the support to shift the shutter aperture out of alignment with the frame aperture to close the latter, and means acting in response to operating position of the support to shift the shutter aperture into overlapping relation with only that end portion of the plate aperture that is occupied by the arm, and control means actuable to shift the support between its said positions.

5. In a device responsive to the direction of an airstream adjacent an outer surface of an aircraft, a frame having an outer face and adapted to be mounted in an aircraft with the outer face substantially flush with an outer surface thereof, means forming an elongated aperture in said surface outer face structure mounted with respect to the frame for swinging movement in response to the direction of a moving airstream, confining means actuable to align said structure with the length of said aperture, and control means actuable to shift said structure, when so confined, between respective inner and outer positions with respect to said surface.

6. In a device for indicating the direction of an airstream adjacent an outer surface of an aircraft, a frame having an apertured outer face and adapted to be mounted in an aircraft with the outer face substantially flush with an outer surface of the aircraft, structure responsive to the direction of a moving air stream and including a vane shaft mounted for swinging movement about a vane axis transverse of said face, a vane fixedly mounted on the shaft, confining means actuable to swing the vane about said vane axis into alignment with the aperture, control means actuable to move the vane, when so confined, substantially parallel to its axis between respective inner and outer positions with respect to said face of the frame, and means acting to release the confining means in outer position of the vane.

7. In a device for indicating the direction of an air stream adjacent an outer surface of an aircraft, a frame having a substantially flat outer face and adapted to be mounted in an aircraft with its said face substantially flush with an outer surface of the aircraft, a carriage mounted on the frame for linear translational movement transversely of said face between respective idle and operating positions, guide means acting between the carriage and the frame to prevent their relative rotation about said axis, a vane mounted on the carriage for swinging movement about an axis substantially parallel to the carriage movement, the vane extending axially beyond the outer face of the frame in operating position of the carriage and being withdrawn inwardly of that face in idle position of the carriage, output means responsive to swinging movement of the vane with respect to the carriage about said axis, and drive means selectively actuable to shift the carriage between its said positions.

8. In a device for indicating the direction of an air stream adjacent an outer surface of an aircraft, a frame having a substantially flat outer face and adapted to be mounted in an aircraft with its said face substantially flush with an outer surface of the aircraft, there being an elongated aperture in said face, a carriage mounted on the frame for movement transversely of said face between respective idle and operating positions, a shaft journaled on the carriage on an axis substantially in the plane of the carriage movement, one end of said shaft lying substantially in the plane of said face near one end of the aperture in operating position of the carriage and being spaced inwardly of the face in idle position of the carriage, a vane, means mounting the vane with respect to the shaft in position axially outward of said end of the shaft and radially offset from the shaft axis, the vane being aligned with the aperture when the shaft is in a definite rotational position with respect to the frame, releasable aligning means actuable to confine the shaft in said definite position, means selectively actuable to actuate the aligning means and to shift the carriage to idle position, and means actuable to shift the carriage to operating position and to release the aligning means.

9. In a device for indicating the direction of an airstream adjacent an outer surface of an aircraft, a frame having a substantially flat outer face and adapted to be mounted in an aircraft with its said face substantially flush with an outer surface of the aircraft, there being an elongated aperture in said face, a carriage mounted on the frame for movement transversely of said face between respective idle and operating positions, a shaft journaled on the carriage on an axis substantially in the plane of the carriage movement, one end of said shaft lying substantially in the plane of said face near one end of the aperture in operating position of the carriage and being spaced inwardly of the face in idle position of the carriage, a vane, means mounting the vane with respect to the shaft in position axially outward of said end of the shaft and radially offset from the shaft axis, control means selectively actuable to shift the carriage between its idle and operating position, and releasable aligning means acting by virtue of carriage movement to confine the vane in alignment with the aperture during said movement and to release the vane in operating position of the carriage.

10. In a device for indicating the direction of an airstream adjacent an outer surface of an aircraft, a frame having an apertured outer face and adapted to be mounted in an aircraft with the outer face substantially flush with an outer surface of the air-craft, vane structure, a support on which the vane structure is mounted for swinging movement about an axis in response to the direction of a moving airstream, said support being shiftable to move said vane structure bodily through said aperture between respective inner and outer positions with respect to said face of the frame, shutter means for the aperture capable of three conditions in which the aperture is closed, partially closed and substantially open, respectively, means acting in response to inner position of the vane structure to shift the shutter means to its first said condition to close the aperture, means acting in response to outer position of the vane structure to shift the shutter means to its second said position, said support then extending through and effectively closing that portion of the aperture left open by the shutter means, and control means actuable to shift the shutter means to its last said condition and to cause the said shifting of the support.

11. In a device for sensing a physical property of an airstream adjacent an outer surface of an aircraft, a frame having an apertured outer face and adapted to be mounted in an aircraft with the outer face substantially flush with an outer surface of the aircraft, a support mounted on the frame for movement between an operating position and an idle position, a sensing element mounted on the support, the sensing element extending through the aperture beyond the outer face of the frame in operating position of the support and being withdrawn inwardly of that face in idle position of the support, crank means rotatably mounted on the frame, a link operatively connecting the crank means and the support for driving the latter between its said positions, the said operating and idle positions of the support corresponding to respective angular positions of the crank means adjacent its opposite dead center positions, and control means actuable to shift the crank means between its said angular positions.

12. In a device for sensing a physical property of an airstream adjacent an outer surface of an aircraft, a frame having an apertured outer face and adapted to be mounted in an aircraft with the outer face substantially flush with an outer surface of the aircraft, a support mounted on the frame for movement between an operating position and an idle position, a sensing element mounted on the support, the sensing element extending through the aperture beyond the outer face of the frame in operating position of the support and being withdrawn inwardly of that face in idle position of the support, shutter means actuable to close the aperture substantially in the plane of the outer face, a drive shaft rotatably mounted on the frame for rotation between angular positions substantially 180° apart, means operatively connecting the shaft and the support to move the latter between its operating and idle positions in response to said rotation of the shaft, means operatively connecting the shaft and the shutter means for actuation thereof, and control means actuable to drive the shaft between its said angular positions.

References Cited in the file of this patent

UNITED STATES PATENTS

| | | |
|---|---|---|
| 7,912 | Wilder | Jan. 21, 1851 |
| 1,765,039 | Walker | June 17, 1930 |
| 1,989,332 | Munster | Jan. 29, 1935 |
| 1,996,192 | Daniel | Apr. 2, 1935 |
| 2,384,646 | Schwab | Sept. 11, 1945 |

U. S. DEPARTMENT OF COMMERCE
PATENT OFFICE
CERTIFICATE OF CORRECTION

Patent No. 2,818,730                      January 7, 1958

Gabriel M. Giannini et al.

It is hereby certified that error appears in the printed specification of the above numbered patent requiring correction and that the said Letters Patent should read as corrected below.

Column 7, line 8, before "outer" strike out -- surface --; same line, after "outer face" insert a comma.

Signed and sealed this 1st day of April 1958.

(SEAL)
Attest:
KARL H. AXLINE
Attesting Officer

ROBERT C. WATSON
Commissioner of Patents